Figure 1:
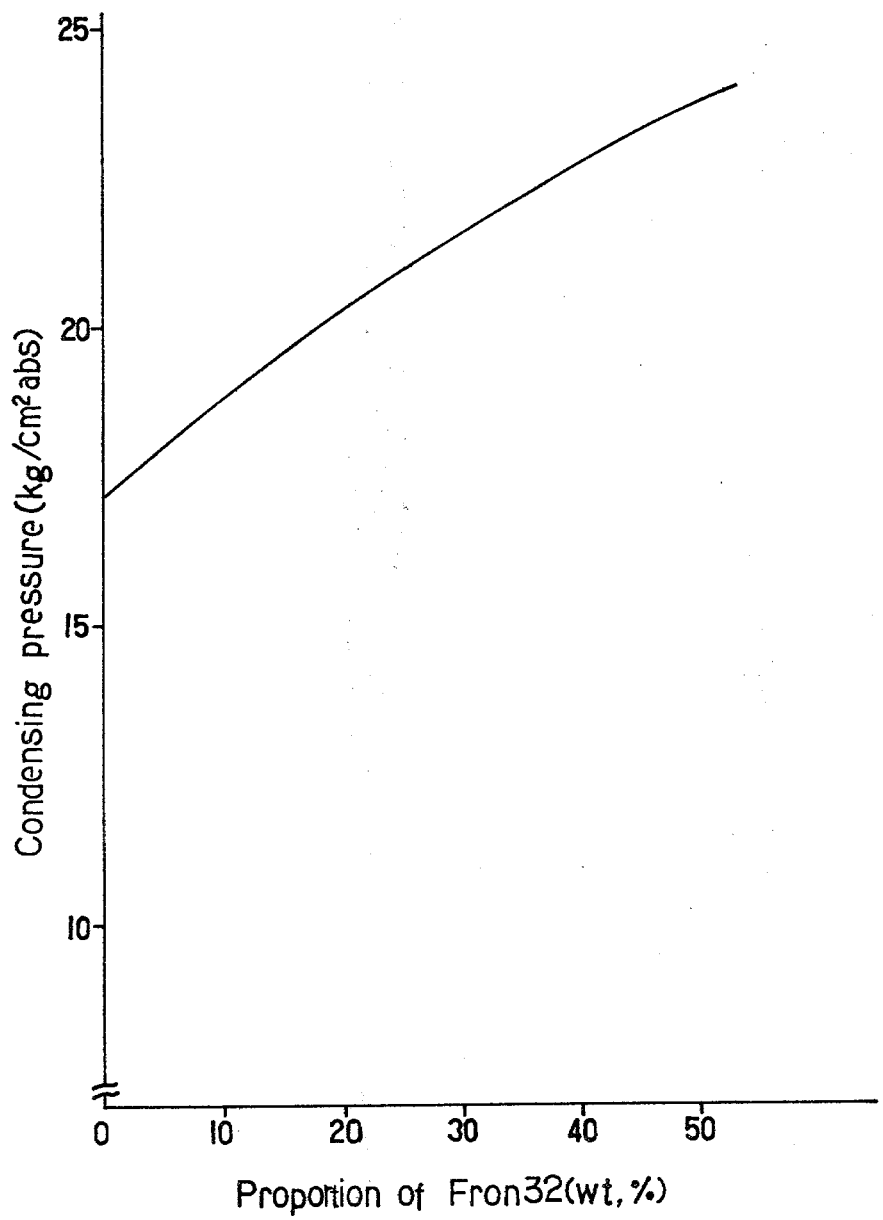

United States Patent [19]  [11] 4,309,296
Enjo et al.  [45] Jan. 5, 1982

[54] REFRIGERANT MIXTURE

[75] Inventors: Naonori Enjo, Suita; Hideki Aomi, Osaka, both of Japan

[73] Assignee: Daikin Kogyo Kabushiki Kaisha, Japan

[21] Appl. No.: 93,110

[22] Filed: Nov. 13, 1979

[30] Foreign Application Priority Data

Nov. 22, 1978 [JP] Japan ............................ 53-144522

[51] Int. Cl.$^3$ ............................................. C09K 5/04
[52] U.S. Cl. ......................................... 252/67; 62/114
[58] Field of Search ........................................... 252/67

[56] References Cited

U.S. PATENT DOCUMENTS 3,336,763  8/1967  Lunde .............................. 252/67 X Primary Examiner—Mayer Weinblatt
Attorney, Agent, or Firm—Larson and Taylor

[57] ABSTRACT

A refrigerant comprising a mixture of chlorodifluoromethane and diffluoromethane.

2 Claims, 4 Drawing Figures

REFRIGERANT MIXTURE

This invention relates to a refrigerant mixture for refrigerators.

Refrigerators are used for various purposes, and a wide variety of refrigerants are also known for use in the refrigerators. The refrigerators are of various types ranging from small to large performance.

With refrigerators, there arises a need to increase the capacity of the refrigerator in use, depending on the application contemplated. In the case of a large-sized refrigerator in which the compressor is driven by a motor with a belt, the capacity can be increased by driving the compressor at a higher speed with use of a different pulley, whereas this is infeasible with refrigerators in which the compressor is of the hermetically sealed type incorporating a motor therein as is the case with usual small-sized refrigerators. It is widely known that a refrigerator affords a higher refrigeration capacity with use of a refrigerant of lower boiling point. The replacement of the refrigerant by a different refrigerant, nevertheless, leads to great a variation in the refrigeration capacity unless the two refrigerants are close to each other in boiling point, consequently necessitating a motor of altered capacity. With hermitically sealed type refrigerators, it is therefore impossible to obtain the desired increased refrigeration capacity merely by exchanging the refrigerant.

An object of this invention is to provide refrigerants which are useful for refrigerators including a hermetically sealed-type compressor and which, when merely replaced by one another, enable the refrigerator to give an increased refrigeration capacity without any necessity of modifying the refrigerator itself.

Another object of the invention is to provide refrigerants useful for refrigerators in which chlorodifluoromethane (hereinafter referred to as refrigerant 22 or Fron 22) is used, the refrigerants being usable in place of Fron 22 to enable the refrigerator to give an increased refrigeration capacity.

Another object of the invention is to provide refrigerants which are usable for refrigerators with a motor suited to Fron 22 and which give the refrigerator a higher refrigeration capacity than Fron 22.

Still another object of the invention is to provide a refrigerator which has a hermetically sealed-type compressor suited to Fron 22 and which gives a higher refrigeration capacity than that using Fron 22 as a refrigerant.

These objects and other features of the invention will become apparent from the following description.

To fulfill these objects, the present invention provides a refrigerant mixture of chlorodifluoromethane and difluoromethane (hereinafter referred to as Fron 32). When the refrigerant mixture contains Fron 32 in a suitably determined ratio relative to Fron 22 (to be expressed in the proportion of Fron 32 based on the weight of the mixture) and used in a refrigerator designed for use with Fron 22, the refrigerant mixture affords a higher refrigeration capacity and a higher energy efficiency ratio [refrigeration capacity (Kcal/hr)/compressor motor input (W)] than when Fron 22 is used singly. In other words, the refrigerant mixture, when used in place of Fron 22, gives an increased refrigeration capacity almost without the necessity of varying the motor capacity. FIG. 1 shows the results achieved by a 5-Hp water-cooled refrigerator (including a hermetically sealed compressor) for producing chilled water, as operated with Fron 22 alone and with mixtures of Fron 22 and Fron 32. It is seen that the refrigerant mixtures provide a higher refrigeration capacity and a higher energy efficiency ratio than the Fron 22 used singly. The experiment was conducted by operating the same refrigerator under the conditions listed in Table 1 while supplying water to the condenser and evaporator at a substantially constant rate and using different refrigerants.

TABLE 1

| Proportion of Fron 32 (wt. %) | Condensing pressure (kg/cm²abs) | Condensing temp. (°C.) | Evaporating temp. (°C.) | Refrigeration capacity (Kcal/hr) | Heat exchange capacity (condenser) (Kcal/hr) | Energy efficiency ratio (Kcal/W) |
|---|---|---|---|---|---|---|
| 0 | 17.15 | 43.8 | 3.2 | 12580 | 18020 | 1.98 |
| 5 | 17.99 | 43.8 | 3.2 | 13010 | 18390 | 2.10 |
| 10 | 18.80 | 43.8 | 3.2 | 13330 | 18860 | 2.10 |
| 15 | 19.58 | 44.1 | 3.1 | 13600 | 19270 | 2.08 |
| 20 | 20.25 | 44.4 | 2.9 | 13800 | 19690 | 2.05 |
| 25 | 20.90 | 44.8 | 2.7 | 13960 | 19920 | 2.00 |
| 30 | 21.55 | 45.3 | 2.5 | 14110 | 20150 | 1.95 |
| 35 | 21.13 | 45.6 | 2.3 | 14240 | 20630 | 1.87 |
| 40 | 23.75 | 46.0 | 2.1 | 14350 | 21000 | 1.78 |

Figure 2:
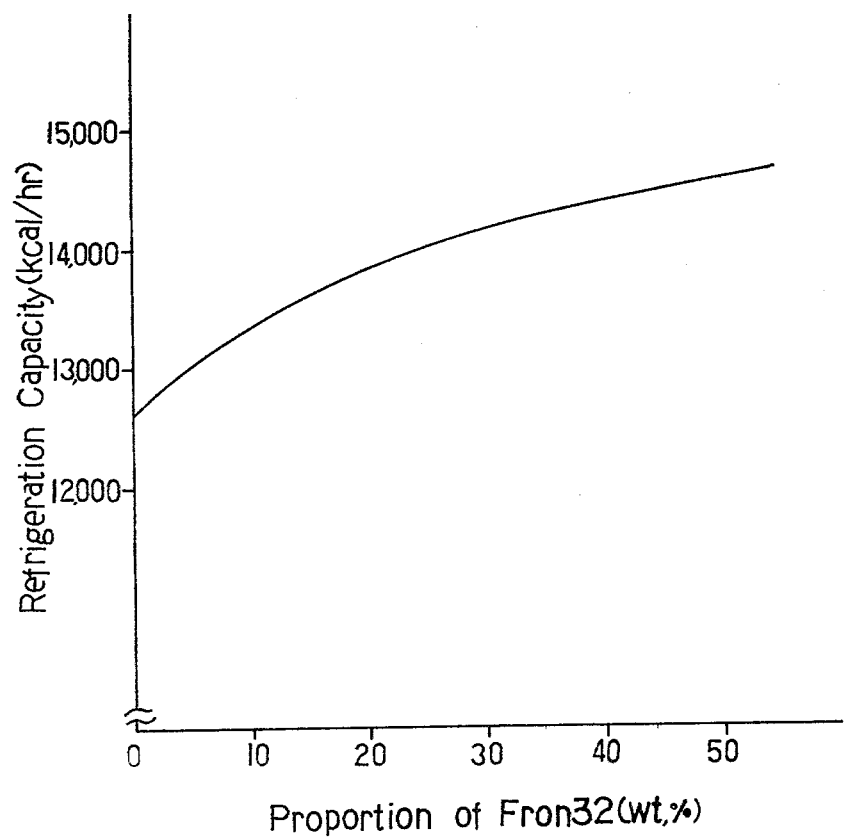
Figure 3:
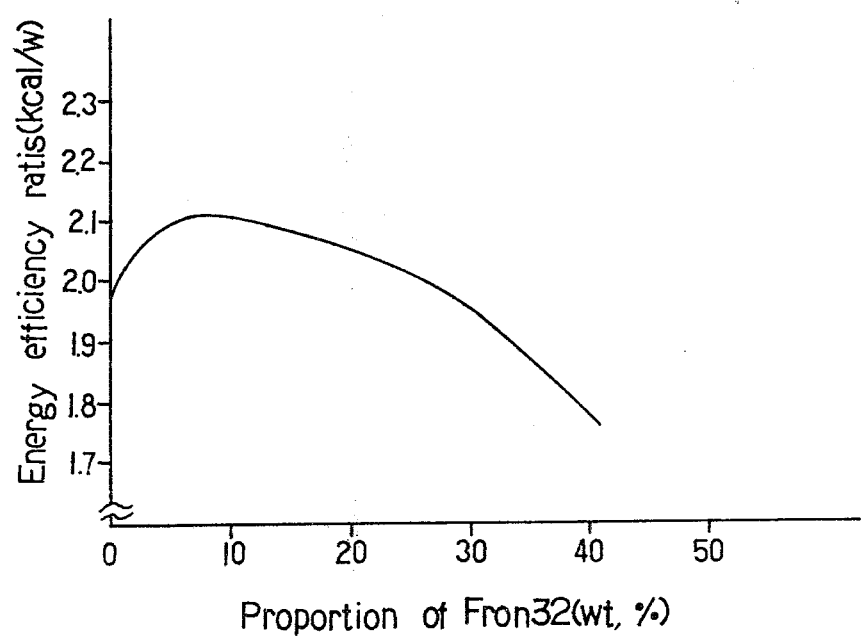

FIGS. 1 to 3 show the variation in the proportion of Fron 32, the variation in the refrigeration capacity of the refrigerator and the variation in the energy efficiency ratio observed in the experiment. Table 1 and FIGS. 1 to 3 reveal that under the experimental conditions listed, the condensing pressure and the refrigeration capacity increase with the increase in the proportion of Fron 32. However, the rate of increase in the refrigeration capacity decreases with the increase in the proportion of Fron 32 partly because the refrigeration capacity is influenced by the amount of circulation and the characteristics of the refrigerant and by the performance of the evaporator and the condenser and partly because the capacity of the heat exchanger of the refrigerator is constant. It is further noted that the use of Fron 32 in mixture with Fron 22 achieves a higher energy efficiency ratio than the single use of Fron 22. This is a distinct feature of the refrigerant mixture of this invention. When two refrigerants close to each other in boiling point are used in mixture, the energy efficiency ratio attained is usually intermediate of the ratios achieved by the refrigerants individually, if the same refrigerator is used. However, the refrigerant mixture of this invention, which has a higher heat transfer coefficient than Fron 22, affords up to about 7% higher energy efficiency ratio. The energy efficiency ratio decreases if the proportion of Fron 32 exceeds 30% since the capacity of the heat exchanger of the refrigerator is limited.

The pressure resistance of the refrigerator is dependent on the design factors thereof. Refrigerants having a high vapor pressure, such as Fron 32, is not usable for refrigerators adapted for use with Fron 22. From this viewpoint, the proportion of Fron 32 is preferably up to 30% by weight based on the mixture. When the proportion of Fron 32 exceeds about 30% by weight, the rate of increase in the refrigeration decreases and the effect produced by the use of Fron 32 as mixed with Fron 22 reduces. Accordingly the proportion of Fron 32 (difluoromethane) in the refrigerant mixture of this invention is 5–25% by weight based on the amount of refrigerant.

Figure 4:
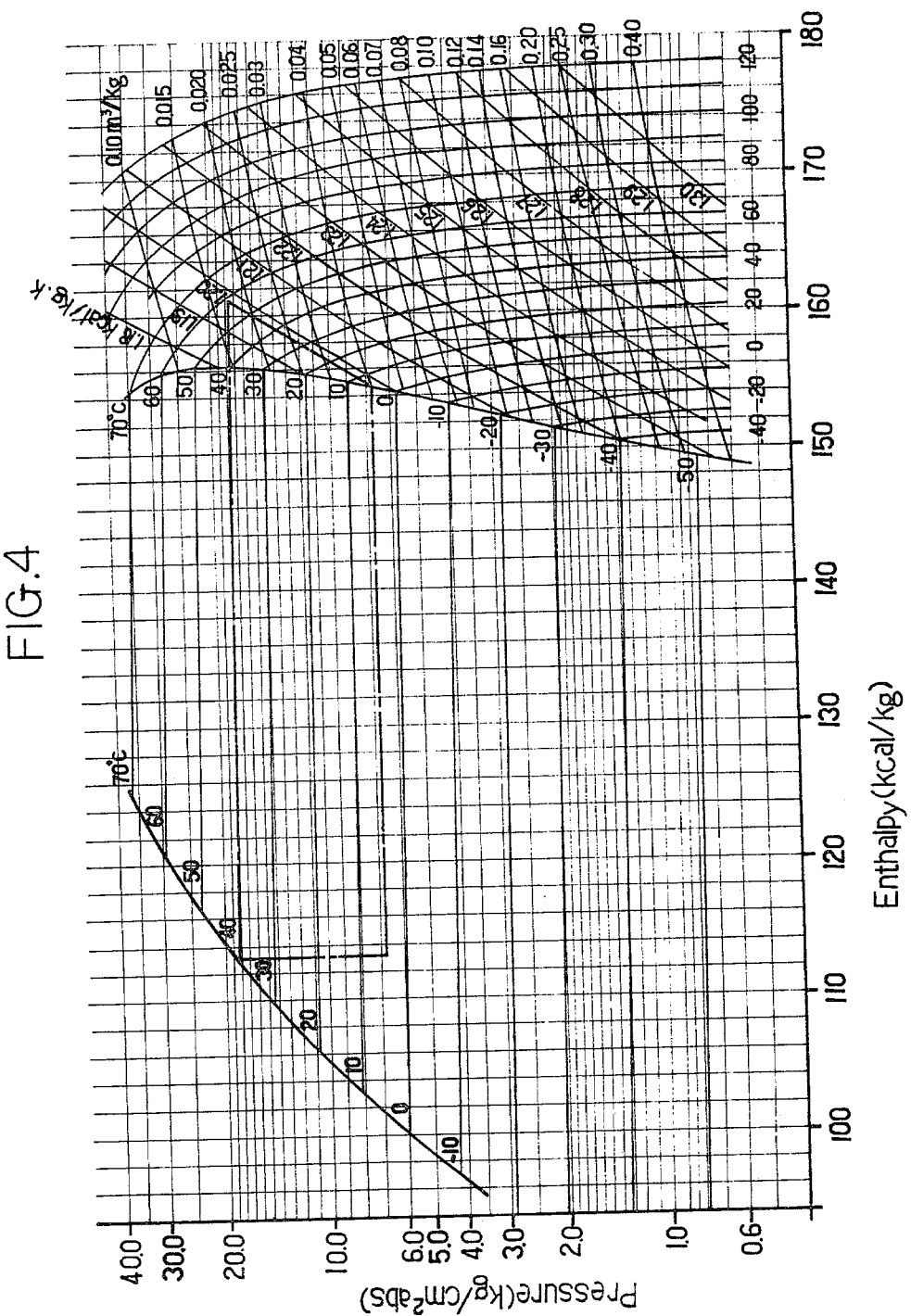

For a better understanding of the refrigerant mixture of this invention FIG. 4 shows a Mollier diagram of a refrigerant mixture of 80% by weight of Fron 22 and 20% by weight of Fron 32. Also plotted on the diagram is a quadrilateral model refrigeration cycle which is indicated in a dot-and-dash line and in which the evaporating temperature and condensing temperature are 5° C. and 40° C. respectively to determine the refrigeration capacity of this cycle, which is further compared with the refrigeration cycle provided by Fron 22 alone at the same evaporating condensing temperature. Table 2 shows the results, which reveal the outstanding features of the refrigerant mixture of this invention.

TABLE 2

|  | Fron 22 + Fron 32 (20 wt. %) | Fron 22 |
|---|---|---|
| Evaporating temp. (°C.) | 5 | 5 |
| Condensing temp. (°C.) | 40 | 40 |
| Evaporating pressure (Kg/cm² abs) | 6.80 | 5.96 |
| Condensing pressure (Kg/cm² abs) | 17.48 | 15.64 |
| Compression ratio | 2.57 | 2.62 |
| Refrigeration capacity (Kcal/kg) | 41.7 | 37.5 |
| Energy of compression (Kcal/kg) | 6.7 | 6.0 |
| Discharge temp. (°C.) | 59 | 57 |
| Coefficient of performance | 6.2 | 6.2 |
| Specific volume (vapor) (m³/kg) | 0.0404 | 0.0404 |
| Amount of circulated refrigerant (vapor) (m³/hr/ton) | 3.22 | 3.56 |

The present invention will be described below in greater detail with referance to an example.

EXAMPLE

A 5-Hp water-cooled refrigerator for producing chilled water is operated for testing with use of a refrigerant mixture of 80% by weight of Fron 22 and 20% by weight of Fron 32. The flow rate of cooling water to be introduced into the expansion valve and the condenser is controlled to adjust the evaporating temperature to 3.2° C. and the temperature of the cooling water to 24°±0.5° C. at the inlet of the condenser and to 35°±0.5° C. at the outlet thereof. At this time, the condensing temperature is 43.8° C. For comparison, the refrigerator is operated with Fron 22 alone. Table 3, Column A shows the other operating conditions when the refrigerator is operated under the above conditions. Table 3, column B shows the heat flux and the heat transfer coefficient of the refrigerant calculated from these operating conditions. The refrigeration capacity and energy efficiency ratio are given in Table 3, column C.

TABLE 3

| Refrigerant | Example Fron 22: Fron 32 (80:20) | Comp. Ex. Fron 22 |
|---|---|---|
| A: Amount of refrigerant used (kg) | 1.34 | 1.4 |
| Input (kW) | 6.32 | 6.4 |
| Higher pressure (kg/cm³ G) | 18.2 | 16.1 |
| Lower pressure (kg/cm³ G) | 5.28 | 4.59 |
| Amount of circulated refrigerant (kg/hr) | 336 | 334 |
| Cooling water supply to condenser (l/min) | 29.8 | 27.3 |
| B: Heat flux (Kcal/m² . hr. °C.) | | |
| Condenser | 5020 | 4550 |
| Evaporator | 73.1 | 65.9 |
| Heat transfer coefficient of refrigerant (Kcal/m² . hr. °C.) | | |
| Condenser | 2775 | 2650 |
| Evaporator | 6418 | 6130 |
| C: Refrigeration capacity (Kcal/hr) | $1.40 \times 10^4$ | $1.26 \times 10^4$ |
| Energy efficiency ratio (Kcal/W) | 2.21 | 1.93 |

We claim:

1. A refrigerant consisting essentially of a mixture of chlorodifluoromethane and difluoromethane, the proportion of difluoromethane being 5 to 25% by weight based on the amount of the refrigerant.

2. A refrigerator in which the refrigerant claimed in claim 1 is used.

* * * * *